United States Patent [19]
Wilson

[11] Patent Number: 6,073,905
[45] Date of Patent: Jun. 13, 2000

[54] METHOD OF OPERATING A FILTER CLEANING SYSTEM, A VALVE AND AN AIR/GAS CLEANING ASSEMBLY

[76] Inventor: George Wilson, 12 Romulus Street, NSW 2153, Australia

[21] Appl. No.: 09/068,694
[22] PCT Filed: Nov. 18, 1996
[86] PCT No.: PCT/AU96/00728
§ 371 Date: May 13, 1998
§ 102(e) Date: May 13, 1998
[87] PCT Pub. No.: WO97/18026
PCT Pub. Date: May 22, 1997

[30] Foreign Application Priority Data

Nov. 16, 1995 [AU] Australia .................................. PN6596

[51] Int. Cl.[7] .......................... B01D 29/66; B01D 29/68; F16K 1/54; F16K 7/17; F16K 31/385
[52] U.S. Cl. .......................... 251/61; 251/30.02; 137/508
[58] Field of Search .................................. 251/61, 30.02, 251/170, 157, 158, 159, 171, 174, 176, 129.17; 137/508

[56] References Cited

U.S. PATENT DOCUMENTS

| | | | |
|---|---|---|---|
| 2,252,923 | 8/1941 | Granetz | 251/159 |
| 3,429,552 | 2/1969 | Huley et al. | 251/129.17 X |
| 3,740,019 | 6/1973 | Kessel et al. | 251/129.17 |
| 3,913,884 | 10/1975 | Rolfe | 251/30.02 X |
| 4,361,309 | 11/1982 | Sogabe | 251/129.08 |
| 4,395,050 | 7/1983 | Wirz | 251/159 X |
| 4,546,955 | 10/1985 | Beyer et al. | 251/129.15 |
| 5,419,367 | 5/1995 | Noya | 251/129.17 X |

*Primary Examiner*—Stephen M. Hepperle
*Assistant Examiner*—John Bastanelli
*Attorney, Agent, or Firm*—Robert D. Schaffer; Clifford Chance; Rogers & Wells, LLP

[57] ABSTRACT

The present invention relates to valve constructions which allows two different flow rates to pass through said valve, whether by two separate control signals or by one control signal and the second flow rate being attained automatically or inherently after the first flow rate has passed through the valve. The invention also includes a filter material cleaning system and a method of operating a filter material cleaning system which utilizes this valve but which helps to prevent the factors which would cause the re-deposition of the filtered particulate material whether onto the row of filter bags being cleaned, and or an adjacent row to the row being cleaned or two adjacent rows to the row being cleaned.

25 Claims, 10 Drawing Sheets

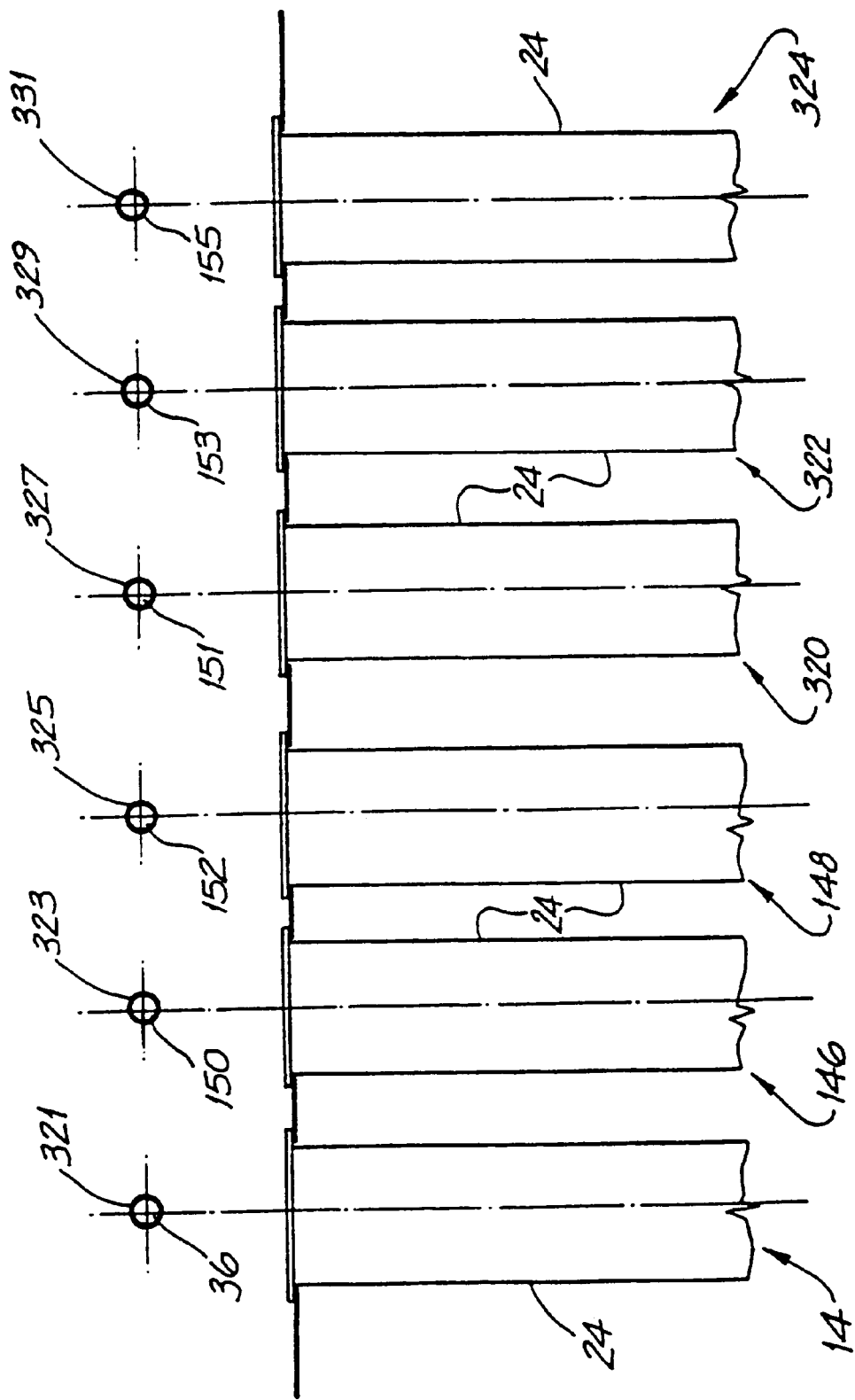

METHOD OF OPERATING A FILTER CLEANING SYSTEM, A VALVE AND AN AIR/GAS CLEANING ASSEMBLY

FIELD OF THE INVENTION

The present invention relates to reverse pulse cleaning of bag house type dust/fume collectors, sometimes called filter bag houses, and to means for controlling the cleaning operation to minimise re-deposition of the dust or fume onto cleaned filter bags during the cleaning cycle.

Whilst the following is focussed on filter bags, the same applies to filter cartridges. Thus wherever the word filter bag is read, it should be taken to include filter cartridges.

BACKGROUND OF THE INVENTION

In a typical dust/fume collector the dust or fume laden air or gas enters a large housing via an inlet connection. Within the housing is located a tube sheet in which there is positioned a plurality of filter bags, which consist of a filter material stretched over a wire cage. The filter material divides the dust laden air/gas from the clean air/gas which passes through it. In a normal arrangement the tube sheet is horizontal and consequently the filter bags hang vertically below the tube sheet and the dust laden air passes through the filter material. The dust is retained or filtered out on the outside of the filter bags and the cleaned air goes on to pass out the outlet.

The dust level continues to build-up on the outside of the filter bag until the pressure drop across the dust collector becomes too high and the flow rate of the dust laden air decreases. At this stage the filter material of the filter bags must be cleaned. This is done by a flow of a pulse of high pressure air to stop the forward (normal) flow of air/gas and reverse the flow at the filter material surface to remove the accumulated dust/fume.

While this cleaning operation can be done with the filter off-line, that is no forward flow through the filter, it is conventionally carried out whilst the filter is operating continuously.

To clean filter bags during the continuous operating mode, the filter bags are arranged in rows. Above each row a blowtube is mounted to allow all the filter bags in the same row to be cleaned simultaneously. A dust collector may contain anything up to say 20 such rows and during the cleaning operation only one row at a time, is taken out of service, by a reverse pulse cleaning air flow, leaving all other bags operating in the forward filtering mode. During the cleaning operation of a single row of filter bags the cleaning pulse lasts for only a fraction of a second during which time the dust built-up on the outside of the filter material is both shocked by the sudden impulse of cleaning air and blown off the filter surface.

A shortcoming with all types of reverse pulse dust collectors at the present time is that as each row of filter bags is cleaned on-line, only a relatively small amount of the dust that is instantaneously removed from the surface of the filter material directly reaches to the collecting hopper at the bottom of the collector, for subsequent removal. In some cases the amount of dust sent to the hopper can be as low as 10 percent, especially if the air to cloth ratio is high.

The reason for the small amount of dust removal is due to the fact that a lot of the dust is either redeposited back onto the filter surface as soon as the cleaning pulse is stopped, or it is deposited onto the adjacent filter bags. Dust and fume re-deposition occurs after the cleaning pulse ceases, the forward direction airflow resumes immediately, causing any nearby dust/fume particles to redeposit by flowing to the surface of the filter bags in that row. In the case of the adjacent row or rows of bags, the flow continues in the forward filtering mode during the cleaning operation and is always available for deposition.

One particular study, "Performance of a Pulse-Jet filter at high filtration velocity-II Filter Cake Re-deposition." Leith, First & Feldman JAPCA July 1977, showed that when flyash is being filtered at an air to cloth ratio of 10 fpm (feet per minute), the quantity of dust that arrives in the hopper is only 12 percent of the total dust present on each filter bag. Of the remaining 88% of the dust, 38 percent was redeposited on the same bag, whilst 50 percent was deposited on adjacent bags.

One known method of attempting to reduce the re-deposition in a dust collector, is to relocate the dust laden air/gas entry of the dust collector from the normal bottom entry, up to a top entry. In a bottom entry system the dust laden air enters at the top of the hopper where some of the heavy particles drop-out and the remaining air/gas rises up to the filter bags. In the top entry system the dust laden air/gas enters at the top of the filter just below the tube sheet and all air/gas passes downwards past the filter bags. It is this downward component of air/gas flow which helps wash away the dust/fume particles during the cleaning phase.

Whilst this arrangement has some effect on reducing the level of re-deposition, it is only a partial solution and is not accepted by dust collector manufacturers as a good solution to the problem. One reason for poor acceptance by dust collector manufacturers is that the top entry configuration is accompanied by higher capital costs. Another main reason for wanting reduce re-deposition is that existing dust collectors, with bottom entry suffer excessive pressure drop. To change to top entry is very expensive and makes the installation of a new dust collector appear the more attractive alternative.

SUMMARY OF THE INVENTION

The invention provides a valve used to deliver air to periodically clean a filter material, said valve including a compressed air inlet and outlet and a sealable port therebetween, said port being selectively sealed by a sealing member which can be moved between a closed condition relative to said port and at least a first open condition and a second open condition, at said first open condition air flow through the open port would be greater than the air flow through said port when said sealing member and said port are in said second open condition at a predetermined operating pressure, said valve including simultaneously or sequentially actuatable seal or port re-positioning means so that when said seal or port re-positioning means is actuated, said port or said seal member are repositioned relative to each other so as to attain said second open condition.

Preferably said seal member cooperates with a diaphragm so as to seal said port and be moved thereby, between said closed and said first open conditions.

Preferably said diaphragm moves said seal member by means of a pressure differential produced across said diaphragm.

Preferably said first or second open condition is selected or attained by means of a second diaphragm arrangement cooperating with a first diaphragm, so as to move said seal member from said first open condition to said second open condition, or from said second open condition to said first open condition.

Preferably attainment of said second open condition from said first open condition or attainment of said first open condition from said second open condition is achieved by said seal member moving away from or toward said port being relatively substantially stationary, or said port moving away from or toward said seal member, said seal member in this alternative being relatively stationary.

Preferably said port is formed as part of a member which can move relative to said outlet or said inlet of said valve, or an inlet to said blowtube and or said port of said valve, said member being able to move in two directions which would allow said valve to attain said second condition, or allow said valve to attain said closed condition.

Preferably said member is biased towards said seal.

Preferably said member is an elastomeric formation which includes a spring characteristic of spring type formation, so that when pressure is applied by said seal member it can be compressed so as to provide a seat for said seal member.

Preferably the rate of decompression of said elastomeric formation is controlled by means of spring characteristics.

Preferably said elastomeric formation has a hollow portion such that the decompression or expansion of the elastomeric formation is controlled by the rate at which air will enter the hollow portion via a bleed hole or other entry mechanism.

Preferably said member is a formation which is of a hollow construction having a at least one bleed hole so that said formation will inflate or deflate, so that when pressure is applied by said seal member, the formation will deflate and be compressed so as to provide a seat for said seal member.

Preferably when said valve is placed in said first open condition, said elastomeric formation will inflate at a predetermined rate so as to place, over a predetermined period of time, said valve into said second condition.

Preferably said member is a pipe member which is able to slide relative to a portion of said valve, said pipe member including an elastomeric or spring assembly so as to move said pipe member in order to place said valve into said second open condition, from said first open condition.

Preferably said seal member attains said first open condition by said diaphragm but said second open condition is attained from said first open condition by the subsequent movement of said sliding member towards said seal member.

Preferably said first open condition and said second open condition are selected by two control signals or actuations.

Preferably said first open condition and said second open condition are selected by a single control signal such that second open condition is achieved by automatic or inherent means.

Preferably said first open condition is such that said seal and said port are separated by a maximum relative distance and at said second open condition said relative distance is reduced.

The invention also provides a remotely controllable compressed air valve to control air flow to clean a filter material, said valve including an inlet and outlet and a communicable passage therebetween and a seal means to selectively seal a port of said passage, said seal means being positionable relative to said port so as to produce two open conditions, a first open condition being attained so that a predetermined relatively high air flow passes through said valve, whereas at said second open condition said air flow is reduced to a predetermined level lower than said predetermined relatively high air flow.

The invention also provides a remotely controllable compressed air valve to control air flow to clean a filter material, said valve including an inlet and outlet and a communicable passage therebetween and a seal means to selectively seal a port of said passage, said seal means and said port being able to be placed in a closed condition and being able to attain a first open condition when they are positioned at a first distance from each other and said port being moveable so as to close said first distance to a second distance which is less than said first distance, and thus said port and said seal are able to attain a second open condition.

Preferably the time taken for said second open condition to be attained after said first open condition, is equivalent to the time for the maximum air flow to be operating at a higher average level than the level of air flow when said second open condition is attained.

Preferably said valve operates with two different and distinct phases. Preferably when a cleaning cycle starts said valve is fully opened up to a full capacity air flow.

Preferably full capacity air flow or said first open condition or said first open condition will last for only a short time, up to 20 to 500 milliseconds but most preferably 40 to 100 milliseconds.

Preferably, in a second open condition or said second open condition the opening of said valve is reduced by approximately 5% to 20% of the initial opening.

Preferably said second open condition or second open condition is for approximately 0.5 to 2 seconds duration.

Preferably, said first open condition includes an air flow passing through said valve of approximately 4 to 6 times the air flow passing through said valve at said second open condition.

An advantage of embodiments of the above inventions is that they ameliorate or lessen the re-deposition from the filter cleaning system with a potential filter capacity increase of 30% to 400%. Similarly if the extra capacity is not required a reduction in the quantity of re-deposited dust will reduce the operating pressure drop and accordingly reduce the power required by the fan installed on the dust collector, and could, depending on the control system, reduce the amount of compressed air used over a predetermined period of time.

Another advantage of the present invention is that it is simple to apply to most types of dust collectors, irrespective of the dust laden air/gas entry path, because the only part of the dust collector altered or modified is the dust valve and no other. This particular feature makes it very attractive for retrofit/upgrade of an existing poor performing dust collectors.

The invention also provides a method of operating a cleaning system to clean filter material, said system including a blowtube through which can pass compressed air and a valve to control the flow of compressed air in said blowtube, said compressed air exiting said blowtube when said valve is opened to clean said filter material, said method including the steps of:

(a) opening said valve to a first open condition to allow a predetermined relative maximum air flow to pass through said valve;

(b) then partially closing or occluding said valve to allow only a predetermined relative minimum air flow to pass through said valve.

Preferably step (b) of said method occurs automatically or inherently after step (a) has occurred and a predetermined time elapsed.

Preferably step (b) occurs in response to a control signal sent by a control means associated with said system.

Preferably said control means is a timer control means.

Preferably said method includes the step of opening a corresponding valve on at least one adjacent blowtube to the same predetermined minimum air flow of step (b), said opening occurring substantially simultaneously to the opening of said valve at step (a).

Preferably said method includes the step of opening a second valve on an adjacent second blowtube in accordance with steps (a) and (b), once said first mentioned valve has achieved said second open condition.

Preferably said method includes the step of opening a third valve on an adjacent third blowtube in accordance with steps (a) and (b), once said second valve has achieved said second open condition, and so on to each next adjacent blowtube until all rows of filter material in a system have received air flow corresponding to said first and second open conditions of said valves.

An advantage of the above method of operation is the ability to reduce the dust re-deposition for the row of filter bags being cleaned or if adjacent blowtubes have their valves opened as indicated above, to further reduce dust re-deposition on these as well.

The invention also provides an air or gas cleaning assembly including: a housing defining a flow path for the air or gas; filter means in the flow path for collecting particulate matter from the air or gas; at least one directing means for directing a gaseous jet at least a portion of the filter means to dislodge the collected particulate matter thereon and to thereby clean the filter means; means to control delivery of gas to the directing means; and means out of the flow path to collect the dislodged particulate matter; wherein said control means is arranged so that, following said dislodging gaseous jet, the directing means delivers, for a time, a further gaseous flow at a lower flow rate than said dislodging gaseous jet, to substantially oppose re-deposition of the dislodged matter.

Preferably said filter means are arranged in rows and each row has delivered to said dislodging jet via a tube means which has as many delivery means associated with it as there are filter means associated with said rows.

Preferably said row contains one of the following: one filter means per row; two filter means per row, more than two filter means per row.

Preferably when there is more than one or more than two rows of filter means, said control means in arranged so that, simultaneously with said dislodging gas jet directed from respective direction means for a row, said control means causes an adjacent row to receive a gas flow at a said lower flow rate than the dislodging jet, to oppose re-deposits of the dislodged matter on the filter means associated with said adjacent row.

Preferably two adjacent rows to a row to be cleaned receive a gas flow at a said lower flow rate than the dislodging jet, to oppose re-deposits of the dislodged matter on the filter means associated with said adjacent row, said gas flow being delivered before said dislodging jet is delivered to the row to be cleaned.

Preferably when there is more than one or more than two rows of filter means, said control means in arranged so that sequentially or simultaneously to a row receiving said lower flow rate, an adjacent row is caused to receive a dislodging jet.

Preferably said control means functions to apply the above dislodging jets and said lower flow rates simultaneously or sequentially to said rows of the assembly, by starting at one row and applying the jets and lower flow rates to the rows, in one direction away from said first mentioned row, until all rows in the assembly are cleaned.

Preferably said control means functions to apply the above dislodging jets and said lower flow rates to said rows by starting at one row and applying the jets and lower flow rates to the rows in two directions away from the first mentioned row, until all rows in the assembly are cleaned.

BRIEF DESCRIPTION OF THE DRAWINGS

Embodiments of the present invention will now be described, by way of example only, with reference to the accompanying drawings in which:

FIG. 13 illustrates a view of 6 rows of filter bags.

DETAILED DESCRIPTION OF THE EMBODIMENTS

Figure 1:
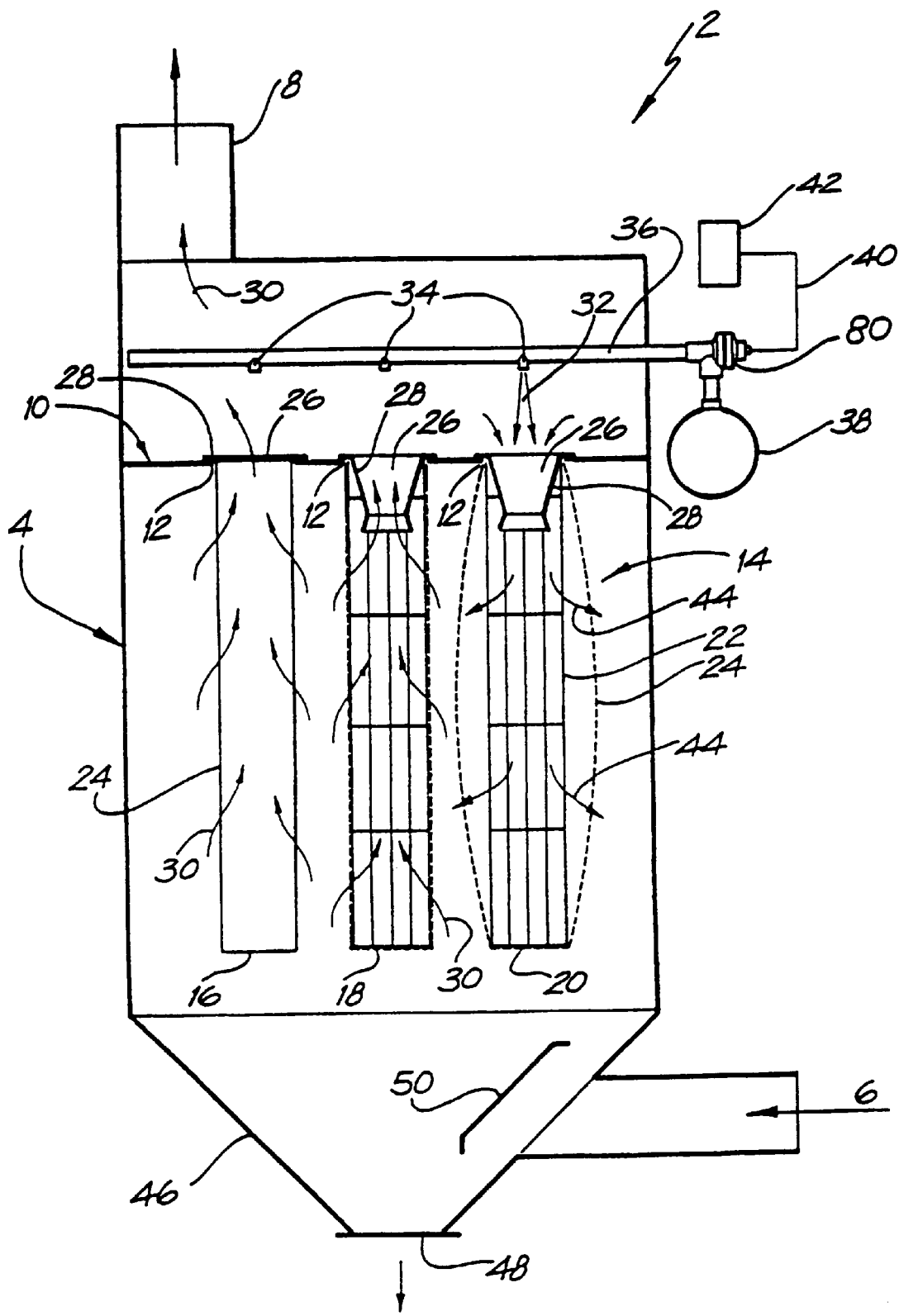
FIG. 1 illustrates a cross section through a side elevation of a reverse pulse dust collector or bag house.

Illustrated in FIG. 1 is a cross section through a side elevation of a bag house 2. The bag house 2 has a housing 4 which has a dirty gas inlet 6 at one end, preferably at a lower region and a clean gas outlet 8 at an upper region. The dirty gas inlet 6 feeds the dirty gas into and around a diffuser 50 which can also have the effect of forcing heavy particles which are air or gas laden to accumulate directly into the hopper 46. Other lighter air laden dust particles will then proceed upwards and through the filter material 24 in the direction of arrows 30 and continuing through the clean gas outlet 8 also in the direction of arrows 30. Separating the dirty gas side and clean gas side of the housing 4 is a filter bag support plate 10 which has a series of apertures 12 arranged in rows therein. In each aperture 12 is located a filter bag 16, 18 and 20 which form a row 14. The filter bags 16, 18 and 20 are each of like construction having a wire cage 22 and the filter material 24 wrapped around the cage 22 and around the base of the cage 22. At the top portion of the filter bag 16, 18 and 20 is an aperture 26 through which air can flow. In the bag house 2 illustrated in FIG. 1, there is located a venturi 28 in each of the upper apertures 26.

Figure 2:
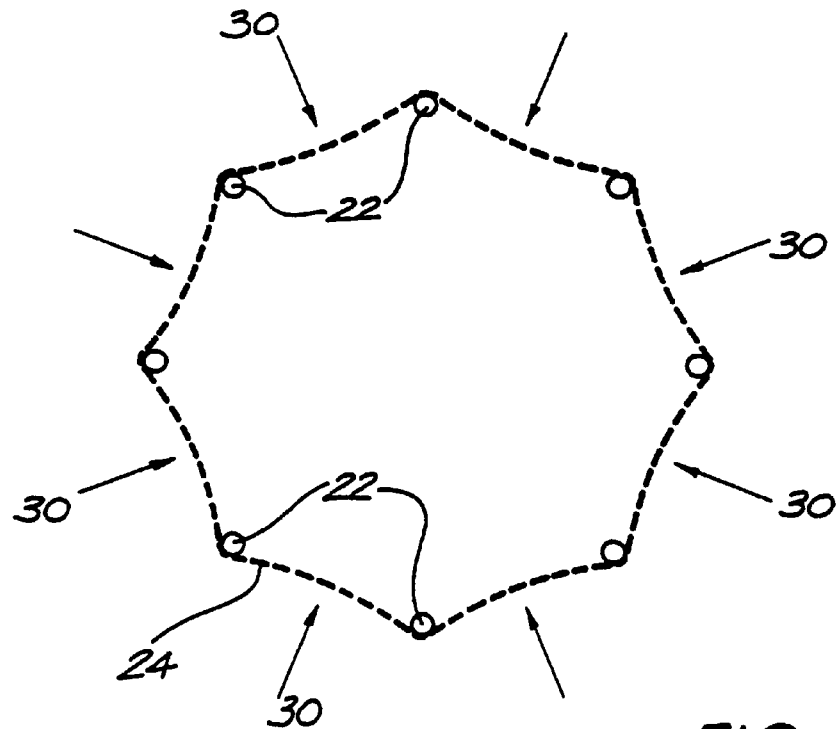
FIG. 2 illustrates a cross section through one of the filter bags of FIG. 1 during filtering operations.
Figure 3:
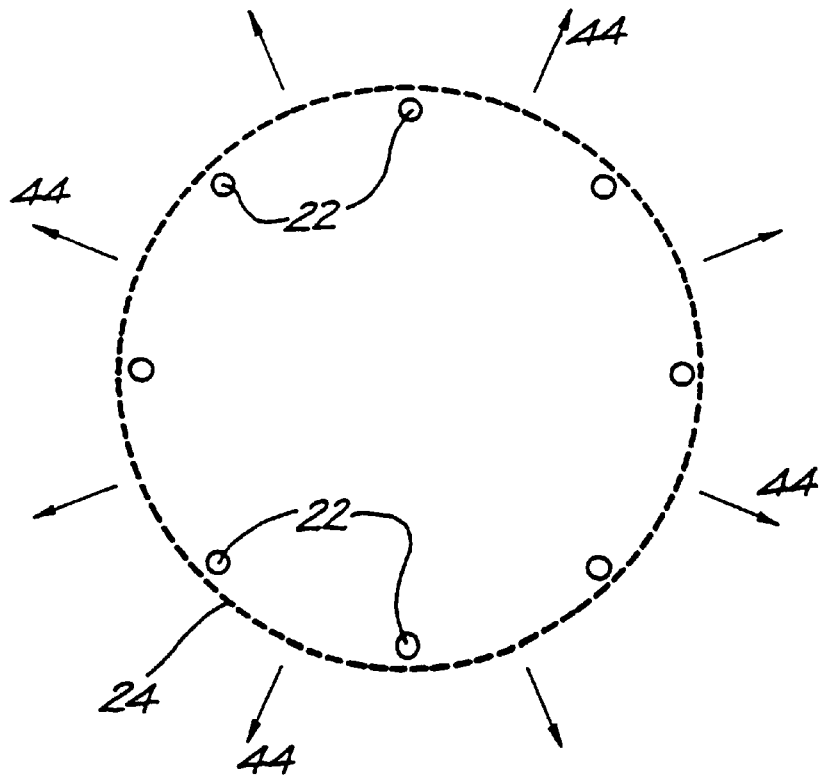
FIG. 3 illustrates a cross section through one of the filter bags of FIG. 1 when a reverse pulse is passed through the filter material for cleaning purposes.

When the filter bags 16, 18 and 20 are removing dust and dirt particles out of a gas, the gas flows in the direction of arrows 30 as is illustrated in FIG. 2 in relation to filter bags 16 and 18 only. Whereas when the filter material 24 is being cleaned, as is the case with filter bag 20, the filter material will adopt a different stretched shape with respect to the cage 22 as is also illustrated in FIG. 3 in relation to filter bag 20.

Filter bag 20 is shown in FIG. 1 being cleaned by a pulse of air 32 being ejected from nozzle 34. The air ejected from nozzle 34 is delivered to the nozzle 34 by a blowtube 36 which connects to dust valve 80 as is discussed in more detail with respect to FIG. 4. The nozzle 34 in an actual situation may be a nozzle structure added to the blowtube 36 or it may simply be a drilled hole or port in the blow tube 36 which will emit air or gas in the direction of the filter bags 16,18 and 20.

The inlet 94 of the dust valve 80 connects to a header 38 which is filled with compressed air by means of a compressor (not illustrated). The dust valve 80 is connected by means of a pilot tube 40 which connects to the pilot port connection 100 and pilot port 102 (of FIG. 4). At a remote location a solenoid enclosure 42 includes a solenoid for each dust valve 80 for opening the pilot tube 40 to atmosphere, thus opening the pilot port 102 (of FIG. 4) to atmosphere, thus opening the dust valve 80. When the dust valve 80 is opened, a pulse or jet stream of air (as generally indicated by the pulse of air 32) is emitted from each nozzle 34 and causes an air flow in the direction of arrows 44. The pulse of air 32 will thus have a dual effect. Firstly it will remove dust particles from the external surface of the filter material 24, by expanding, very rapidly, the filter material 24 and when the filter material comes to a relatively sudden stop dirt and other accumulated particles on the filter material will be thrown off the filter material. Secondly, the pulse of air 32 will provide a reverse air flow through the filter material 24, in the reverse direction thus also entraining particles and carrying them out of the filter material. The dust thus removed from the filter material 24 will collect and fall in the hopper 46, where the dust and dirt can be extracted via the outlet 48.

For the purposes of illustration only, the row of filter bags 14 of FIG. 1 is shown with the filter bag 20 being subjected to a cleaning air flow or reverse pulse 32. This does not occur in actual systems because once the dust valve 80 is opened, each of the nozzles located along the blowtube 36 will eject air at the same time. Only one valve 80 is utilised to control the movement of air through the blowtube 36, and thus into each row of filter bags, such as row 14, which corresponds to that blowtube 36.

Figure 4:
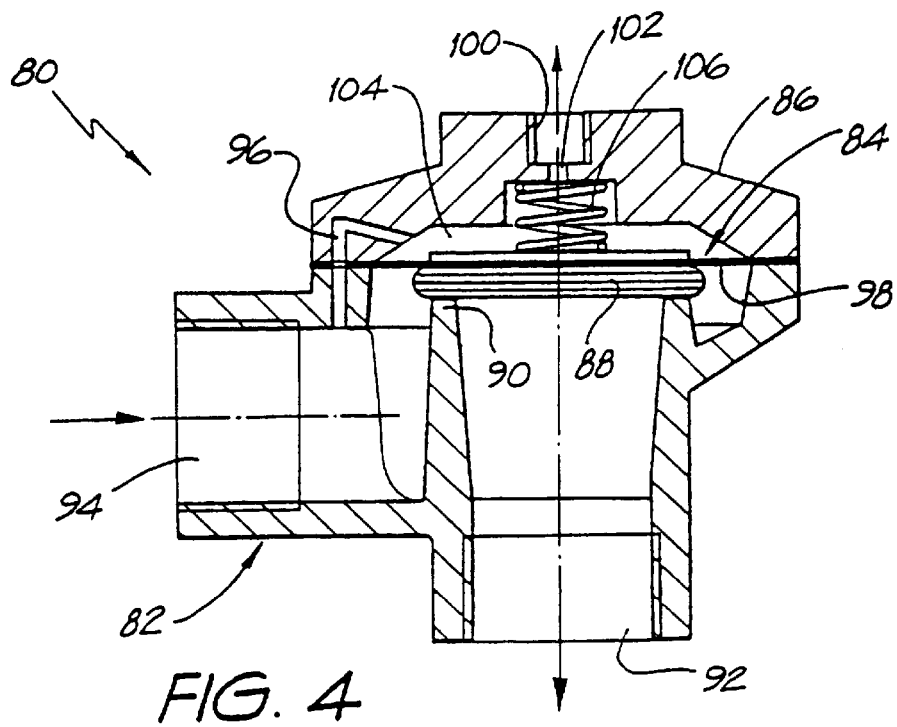
FIG. 4 illustrates a cross section through a valve of the prior art.

Illustrated in FIG. 4 is a standard single diaphragm dust valve 80 of the prior art. The dust valve 80 consists of a body 82, diaphragm assembly 84 and a top section 86. Attached to the diaphragm assembly 84 is a disc seat 88, which when the valve 80 is in the closed position, rests firmly on the valve seat 90, sealing the outlet 92.

When assembled into a cleaning system, compressed air is connected to the valve inlet 94, and the blowtube 36 (as in FIG. 1) is connected to outlet 92. A pilot valve connection 100 and associated pilot valve port 102 is closed off by means of a pilot tube 40 and associated solenoid as described in respect of FIG. 1 above. In the closed condition of the valve 80, compressed air passes through inlet 94 and up through a main bleed 96 and impresses air pressure on the top of the diaphragm assembly 84. Because of the unbalanced forces created by the pressure operating on substantially all of the top of the diaphragm assembly 84 and the pressure only acting on an annular section 98 of the under side of diaphragm assembly 84, the disc seat 88 is forced onto the valve seat 90, sealing off the outlet 92 and preventing air from entering the blowtube 36 (of FIG. 1). The return compression spring 106 aids the return of the diaphragm assembly 84 to the closed position when pressure is approximately equalised on either side of the diaphragm assembly 84.

To operate the dust valve 80, a remote pilot solenoid valve (which is not illustrated but is stated as being contained in solenoid enclosure 42 of FIG. 1) connected to pilot valve connection 100, is electrically operated to open the pilot port 102 to atmosphere in pilot tube 40. At this point the air enclosed by the top section 86 above the diaphragm assembly 84 is drained to atmosphere and the diaphragm assembly 84 and the rest of the assembly lifts off the valve seat 90 passing air into the outlet 92 and into the blowtube 36 of FIG. 1. It should be noted that even whilst the volume enclosed by top section 86 and diaphragm assembly 84 is being drained, the main bleed 96 still allows air to pass from the inlet 94 into the upper volume 104. However, the size of the main bleed 96 is much smaller than the size of the pilot port 102 and the result is that the valve 80 opens.

At a predetermined time the remote pilot solenoid valve is closed which shuts off the pilot port 102 allowing compression spring 106 to push the diaphragm assembly 84 to the closed position. Because of this and with the build up of pressure in pilot tube 40, and upper volume 104 the air passing through the main bleed 96 starts to fill the upper volume 104 of the valve 80. Whilst filling, the diaphragm assembly 84 including disc seat 88 is forced by the pressure being built up on the upper side together with the force of spring 106, against the pressure on the lower side of diaphragm assembly 84 until the disc seat 88 and the valve seat 90 are closed.

The above description covers the operation of a remote pilot operated dust valve and a similar description is applicable to a remote operated integral pilot version whereby the pilot valve and solenoid is an integral part of the valve and is generally integrally formed, fabricated or attached in or at the outlet port 102 or connection 106 area.

Figure 5:
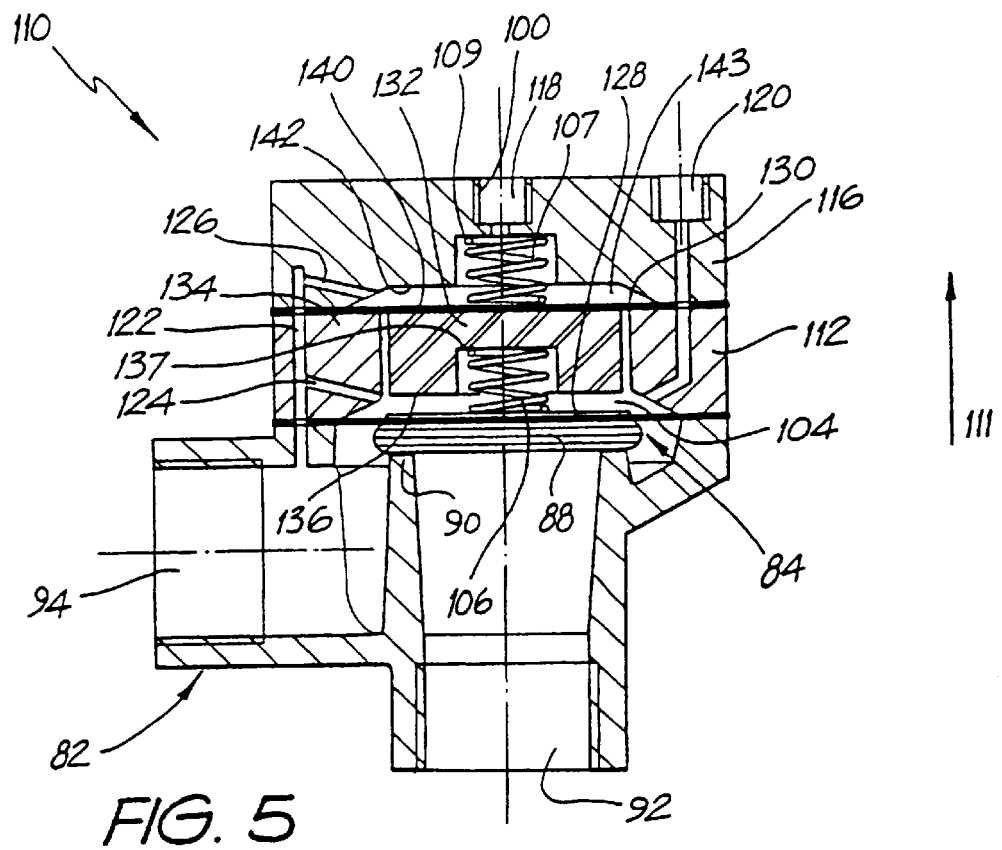
FIG. 5 illustrates a cross section through a valve which embodies the invention.

A two condition or stage (which may be called a 3 condition valve if the closed condition is included) dust valve is constructed by a dual lift valve fitted with two separate diaphragms, one mounted next to the other, such as that illustrated in FIG. 5. To allow comparison with the prior art of FIG. 4 the numbers used in FIG. 4 are the same as those used in FIG. 5 for the same components, only the different components are numbered differently.

As shown in FIG. 5 the lower section of the valve 110 and the diaphragm assembly 84 including the disc seat 88 are the same as those shown in FIG. 4, but the upper assembly is different. The top section 86 of FIG. 4 is replaced by transition section 112 having a cylinder 134 located there through, upper diaphragm assembly 114 and an upper top section 116. The upper diaphragm assembly 114 and the diaphragm assembly 84 are controlled to open and shut via the pilot ports 118 and 120 respectively. Attached to the upper diaphragm assembly 114 is a piston 132 which is received in the cylinder 134 and is able to slide therein in one direction, that is in the direction of arrow 111, and in the opposite direction back to the rest position shown in FIG. 5. The nature of the attachment of the piston 132 to the diaphragm assembly 114 is that if the diaphragm moves in the direction of arrow 111 from the rest position of FIG. 5 or back in the opposite direction to the rest position of FIG. 5 then the piston 132 will follow. The piston 132 has a blind bore 137 to receive a return spring 106 whose purpose has been described previously. The upper section return spring 107 is mounted in a blind bore 109 in upper top section 116.

When installed, compressed air is connected to the valve inlet 94, a blowtube 36 (of FIG. 1) is connected to outlet 92 and both pilot port connections 118 and 120 are closed off by pilot tubes 40 (of FIG. 1) and associated pilot valves, to cause valve 110 to be in the closed position. In this condition, compressed air passes through inlet 94 and up through the bleed passage 122, off which feeds the lower bleed 124 and the upper bleed 126. The air passing through lower bleed 124 impresses air pressure on the top 128 of the diaphragm assembly 84. The air passing through upper bleed 126 impresses the air pressure on the top 130 of upper diaphragm assembly 114. The resultant effect of both these pressures and resultant forces is that disc seat 88 is pushed down onto the valve seat 90 and no air passes out the outlet 92 of the valve 110. At the same time the upper diaphragm assembly 114 and the piston 132 are in a balanced position.

To operate in low lift or low flow rate mode of operation or second open condition of the dust valve, a remote pilot valve (not illustrated) connected to port 120 by pilot tube 40 as in FIG. 1, is electrically operated and opens the pilot port 120 to atmosphere. As a consequence of this the air in the upper volume 104, above the diaphragm assembly 84 is drained to atmosphere and the diaphragm assembly 84 lifts the disc seat 88 off the valve seat 90 allowing air to pass into the outlet 92 and into the blowtube 36 (of FIG. 1). Whilst the diaphragm assembly 84 rises, it is limited in travel and can only lift until it stops against the lower surface of the piston 132. The piston 132 cannot move downward because when the upper volume 104 above the diaphragm assembly 84 is vented to atmosphere, the upper diaphragm assembly 114 will be unbalanced with a net downward force, but the piston 132 is restrained from downward movement either by a backing plate (not illustrated) attached to the top 130 of upper diaphragm assembly 114 piston 132 (which allows movement in the direction of arrow 111 but not in the opposite direction) or the transition section 112 can include a shoulder (not illustrated) which cooperates with a like shoulder (not illustrated) on piston 132 to allow movement of the piston 132 relative to the transition section 112 in the direction of arrow 111, but not in the opposite direction.

For the full lift mode of operation or first open condition of the dust valve 110, both pilot valves (not illustrated) connected to ports 118 and 120, must be operated together opening both ports 118 and 120 to atmosphere. With both ports 118 and 120 open, the upper diaphragm assembly 114 and the diaphragm assembly 84 will each lift to their full stroke and the full lift capacity is actuated allowing air to pass into the outlet 92 and to the blowtube 36 (of FIG. 1) for cleaning the filter bags 16, 18 and 20 in row 14 (of FIG. 1) for example.

At the full or high lift mode or first open condition of the valve 110, the air flow is preferably some 4 to 6 times the air flow at low lift mode or second open condition. To achieve this ratio the opening of the valve 110 is reduced to the second open condition to approximately 5% to 20% of the opening at the first open condition.

It should be noted that the clearance height from the top side 136 of the diaphragm assembly 84 and the lower surface 138 of upper piston 132 establishes and limits the magnitude of the lower or first stage lift. The clearance between the top 140 of the upper diaphragm assembly 114 and the upper surface 142 of the upper top section 116 establishes and limits the magnitude of the second stage lift. The overall lift of the valve 110 is equal to the sum of the first and second stage lifts.

To close the dust valve 110, depending upon whether the valve 110 has attained the first or second open condition, the remote pilot valve or valves (not illustrated) are closed, which will shut off the pilot ports 118 and/or 120 which allows both a pressure build up in the top upper volume 143 and an upper volume 104 and when pressure is equalised or before this equilibrium return springs 106 and 107 bias the diaphragm assemblies 84 and 114 respectively to the closed position, with the air passing through the main bleed passage 122 and upper and lower bleeds 126 and 124, to continue to fill the upper volume 104 and top upper volume 143.

The above describes the operation of a remote pilot operated dust valve and it will be understood to be applicable to an integral pilot version whereby the pilot valves are an integral part of the valve 110 at the outlet port areas.

Figure 6:
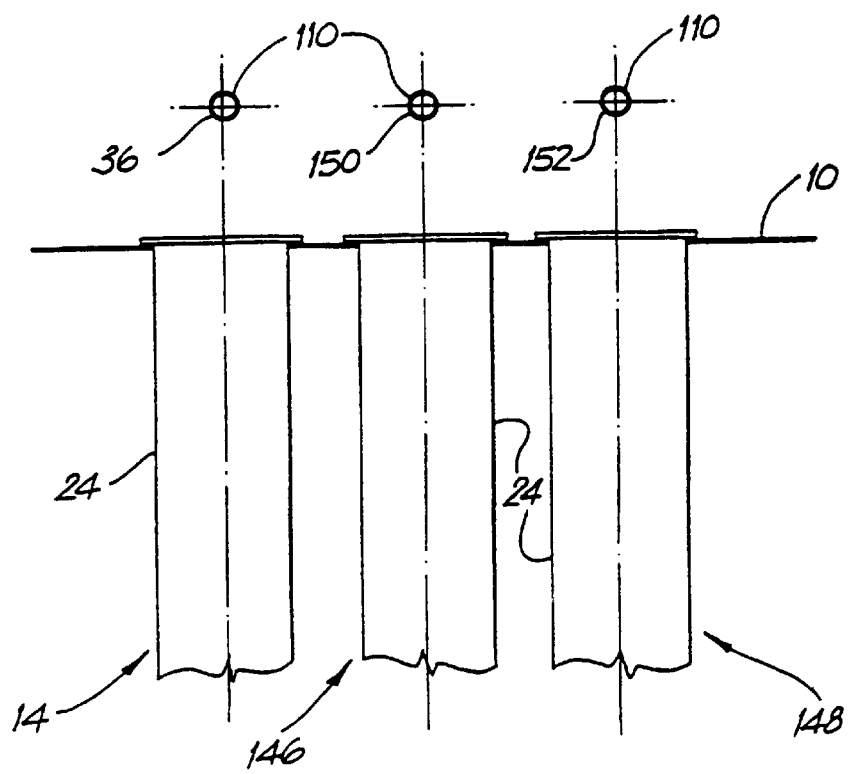
FIG. 6 is a schematic illustration of three filter bags in a row.

It will be understood that the valve 110 is connected to a blowtube 36 (of FIG. 1) and that blowtube 36 cleans a complete row of filter bags simultaneously. The valve 110 will operate in the following manner, with reference to FIGS. 6 and 7, and for the purposes of illustration, the following will involve three adjacent rows 14, 146 and 148 of filter bags (similar to bags 16, 18 and 20 of FIG. 1) in a dust collector as illustrated in FIG. 6. For the purpose of this illustration, assume it is desired to clean the intermediate row 146 of bags at a preselected time. Above each row of filter bags are located three separate blowtubes 36, 150 and 152 each fed from two stage lift valves 110 which are described above. The overall control of all timing functions mentioned in the following description are controlled by an electronic timer, but other controls could be utilised.

At the selected time the low lift pilot valves (such as, in the enclosure 42 of FIG. 1) which connect to respective pilot ports 120 of dust valves 110 for rows 14 and 148 are operated establishing a low cleaning air flow rate in the corresponding filter bags of rows 14 and 148 as shown in FIG. 6. Also at a preselected time (which may be simultaneous with or sequential to the opening of dust valve 110 for rows 14 and 148) both the high and low lift pilot valves (such as in the enclosure 42 of FIG. 1) which each connect to pilot ports 118 and 120 of the dust valve 110 in row 146, will be operated establishing a high cleaning air flow, so as to produce a dislodging jet in the filter bags of row 146. After approximately 40 milliseconds, (but may be between 20 and 500 milliseconds depending on filter material, captured particulate and other factors) the high lift portion of the dust valve 110 for row 146 is closed by means of the appropriate pilot valve which connects to pilot port 118, whilst the low lift pilot port 120 and the corresponding valve section remains open.

All of the low lift sections of the dust valves 110 for rows 14, 146 and 148 stay open for approximately one to two seconds during which time re-deposition of the dust removed from row 146 is inhibited and a larger proportion of dust will be removed to the hopper 46 at the base of the dust collector 2. In this example re-deposition on the adjacent, as well as the cleaned row itself, is substantially prevented from occurring.

Figure 7:
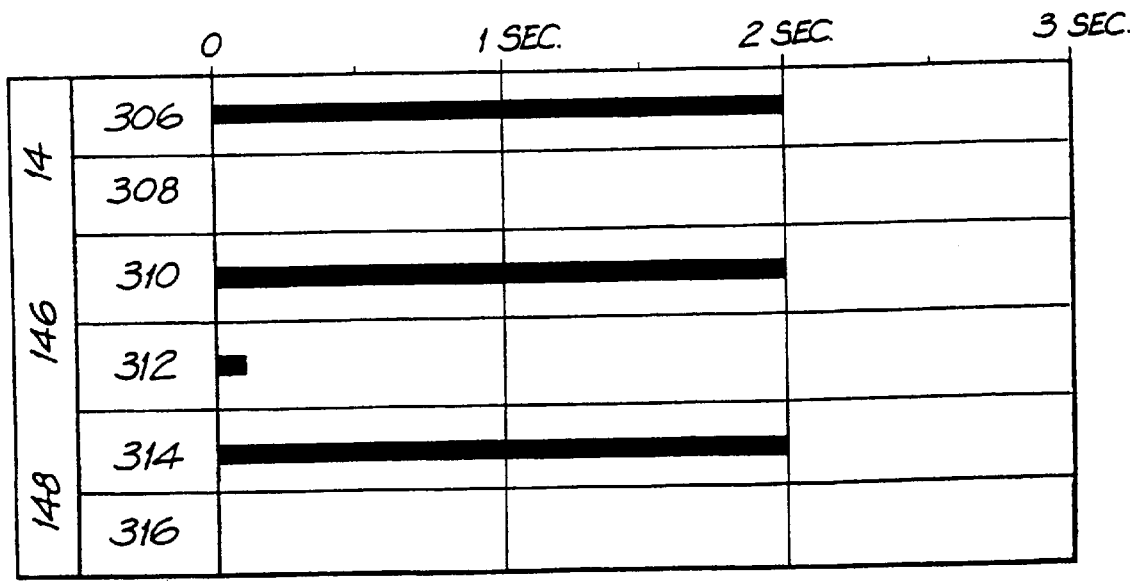
FIG. 7 illustrates a valve timing sequence diagram.

Illustrated in FIG. 7 is a valve timing sequence chart illustrating the previously described operation. It illustrates in that the low lift or low flow or second open condition of the dust valves 110 for each row 14, 146 and 148 functions simultaneously (but can be sequentially as described above) as is illustrated by corresponding row 14-306, 146-310 and 148-314 of FIG. 7. While for a small time period (eg 40 milliseconds (or 20 to 500 milliseconds)) the high lift or high flow or first open condition of dust valve 110 for row 146, as illustrated by row 146-312 of FIG. 7, is opened or actuated simultaneously with the low lift or low flow or second open condition of rows 14 and 148.

In another valve arrangement, the two stage dust valve lift is achieved by a means of an elastomeric spring formation associated with the valve seat 90.

Figure 8:
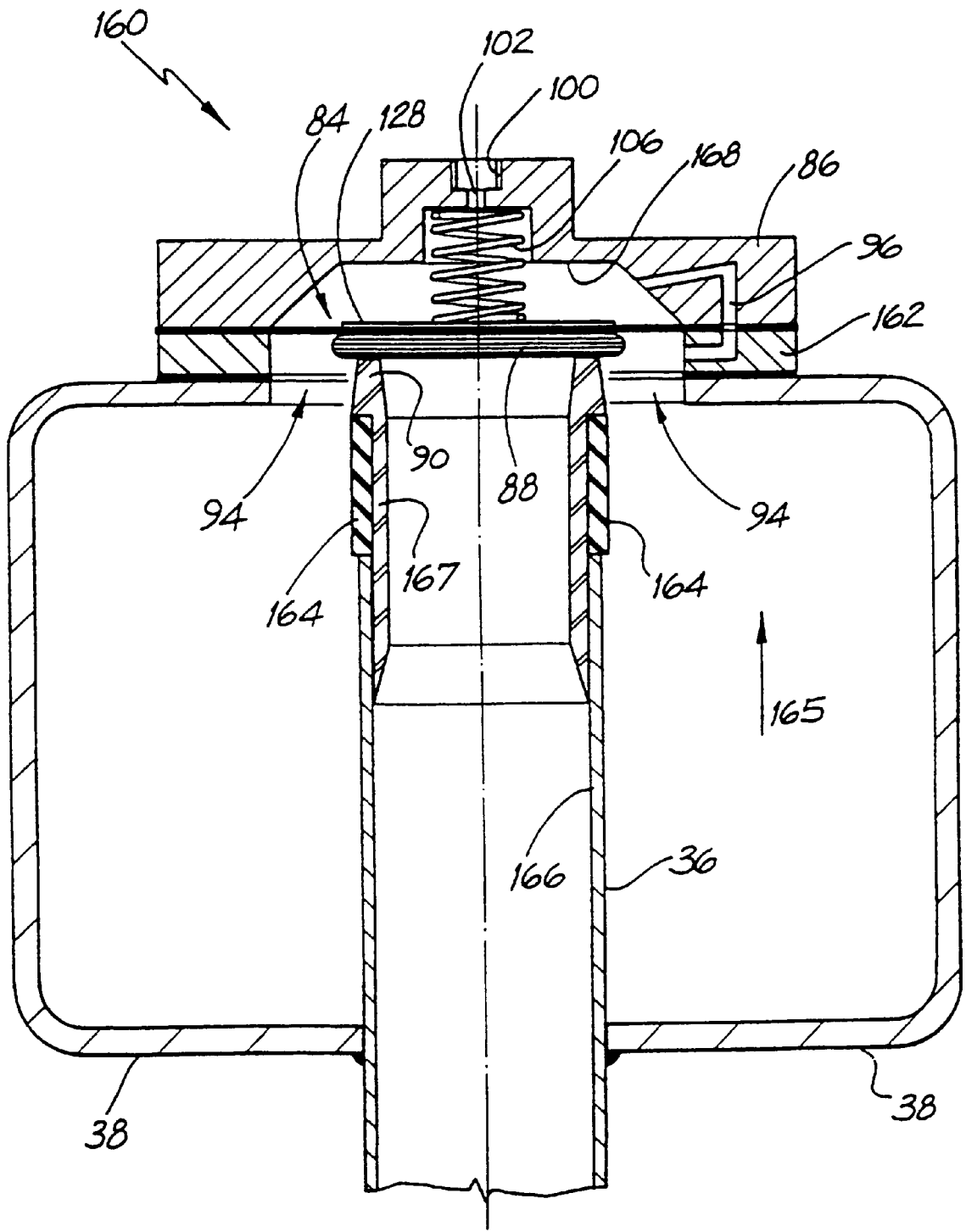
FIG. 8 illustrates a cross section through another dust valve embodying the invention.

FIG. 8 shows such an arrangement of a dust valve 160 in a typical manifold mounted assembly used in large scale dust collectors. The numbering used in FIG. 8 is consistent with the numbering on the previous Figs for like parts.

As illustrated in FIG. 8 the top section 86 and the diaphragm assembly 84 are the same as discussed in the earlier Figs. In this case the dust valve 160 is built into a combined blowtube 36 and header 38 configuration. The air inlet 94 receives air directly from the header 38. The transition adaptor 162 includes the entry and a portion of the main bleed 96, whereas the rest of the main bleed 96 is formed in top section 86 for communication between the respective sides of the diaphragm assembly 84.

An elastomeric spring formation 164 is shown mounted around a pipe member 167 which includes at its end the seat 90. The pipe member 167 is able to slide in the inner bore 166 of the blowtube 36. The elastomeric spring formation 164 can be made of only elastomer type material or a combination of a wire spring over which a moulding of elastomeric material is formed. The elastomer is selected on the basis of the physical and chemical properties, in order to also be able to achieve the desired spring rate.

The design of the elastomeric spring formation 164 is such that when the dust valve 160 is in the closed position as illustrated in FIG. 8, the elastomeric spring formation 164 is substantially compressed and the seat 90 is at the position required to attain high lift, high flow or the first open condition to be attained by the valve 160. The compression force required to compress the elastomer spring formation 164 is achieved by the out of balance force in the diaphragm assembly 84 produced by the pressure differential on diaphragm assembly 84. In the case of large valves this unbalanced force can be approximately 1500 Newtons.

In this design the low lift is achieved by the clearance distance between the underside 168 of the top section 86 and top 128 of the diaphragm assembly 84 when the elastomeric spring formation 164 is fully relaxed.

In use the valve 160 will attain the first open condition when the pilot port 102 is vented to atmosphere when the corresponding pilot valve (not illustrated) is opened. Then the disc seat 88 lifts off the seat 90 allowing air to pass out of the valve 160. Thus high air flow rates are attained for a short period of time until such time or while the pipe member 167 is moved in the direction of arrow 165 until it can move no further, in which case the valve 160 has attained the low flow rate or second open condition.

Inherent in this design is that the elastomeric spring formation 164 produces a heavily damped spring mass system and at the instant the diaphragm assembly 84 lifts off the seat 90, the seat 90 does not move up immediately but responds slowly in accordance with the mass, spring constant and damping factor selected for the action of the elastomeric spring formation 164.

Consequently when this dust valve 160 opens, it moves initially to the high lift position, or high flow position or the first open condition and after or during a time delay (say 20 to 500 milliseconds), established by the spring/mass seat system, attains the second open condition or low lift/low flow rate position.

The elastomeric spring formation 164 also serves the purpose of sealing, to substantially airtight quality, the pipe member 167 and the blowtube 36, when the valve 160 is in a closed condition. Whereas when the valve 160 is open, there is no requirement for airtight sealing.

When this embodiment is used in the relatively common control and timing sequences for cleaning filter bags, it may reduce re-deposition of the cleaned dust onto the same filter bag. The advantage of this embodiment is that although it only prevents same bag re-deposition, which accounts for typically 40% of the re-deposition, it does so in a relatively simple and inexpensive manner and does not require a separate timer for the low or high lift phase, as only one control mechanism is provided for.

If desired to prevent re-deposition onto other bags in other rows, the valve 160 on the row to be cleaned need only be opened some 20 to 500 milliseconds, (or what ever the time delay actually is for the cutting in of the second open condition after the first), after the opening of adjacent valves on adjacent rows.

A big advantage of this design is that it would allow a relatively simple retrofit in a poorly performing dust collector. The existing dust valve top section would re-used and a modified seat is installed.

Although in FIG. 8 the valve 160 has the elastomeric spring formation 164 located in association with the port 90 between the inlet 94 and outlet 92, it can be located at different locations to the same effect, such as in the inlet, in the outlet, the inlet of said blowtube or other port of said valve, together with a re-arrangement of the diaphragm assembly and other features so as to make the different location of the elastomeric spring formation 164 correctly work in the different location.

Figure 9:
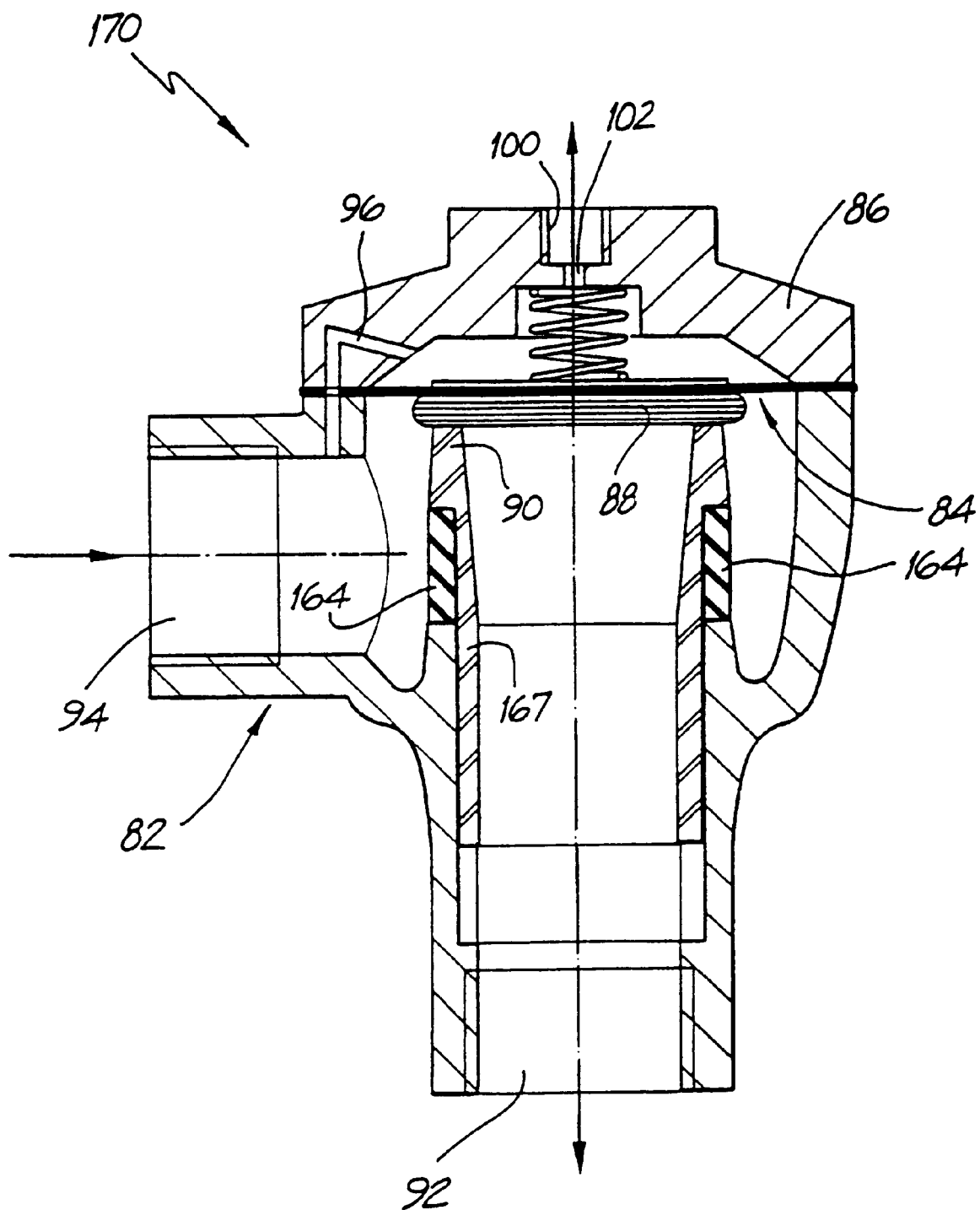
FIG. 9 illustrates a cross section through a valve similar to that of FIG. 8 but of a different configuration.

FIG. 9 shows a valve 170 similar to valve 160 of FIG. 8, with the elastomeric spring formation 164 fitted to a generally standard type dust valve as illustrated in FIG. 4. Common parts to FIG. 4 and FIG. 8 have been like numbered. This valve 170 functions in the same way as the valve 160 except that the valve 170 is mounted into the cleaning system by the same method as the valve 80 of FIG. 4.

Mention was made above about the levels and timing of both the first and second open conditions or phases of the cleaning cycle. These parameters are important for the correct operation of the cleaning system to ensure that whilst re-deposition is reduced it is not achieved at the expense of excessive compressed air consumption. The exact levels of each condition or phase are determined by a knowledge of the jet pump characteristics of the blowtube nozzle and filter bag entry configuration, irrespective of whether a venturi is fitted to the entry of the filter bag or not. Based on the knowledge that the two levels are chosen to ensure that in the second open condition or cleaning/wash away phase the quantity of compressed air fed into the filter bag is only just sufficient to stop the forward flow resuming immediately after the first pulse and no more. As an estimate, the ratio of air flow may vary in high lift mode (first open condition) to low lift mode (second open condition) from approximately 6 to 1 to approximately 4 to 1.

Figure 10:
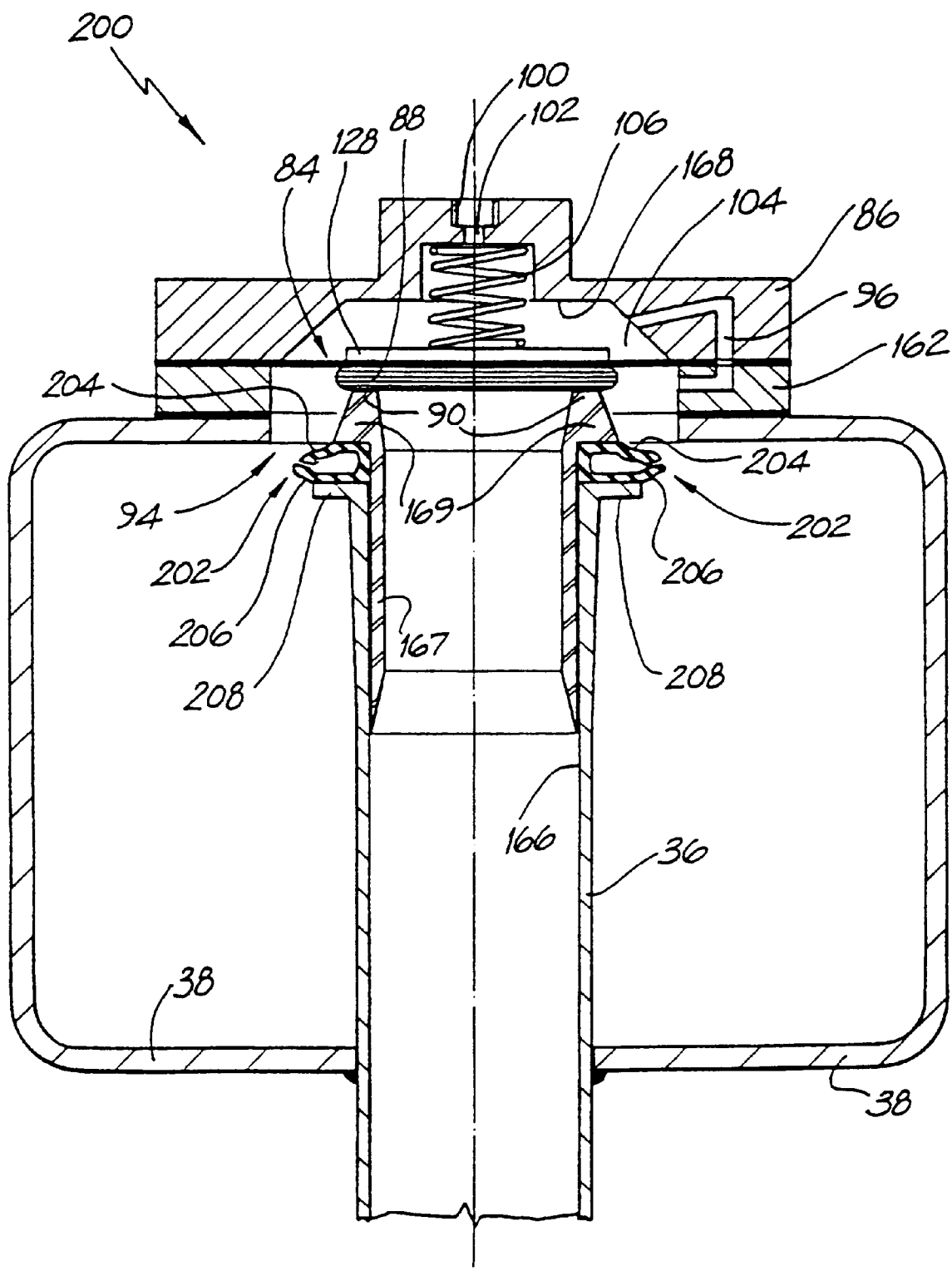
FIG. 10 illustrates a cross section through a valve similar to that of FIG. 8 in a closed condition.
Figure 11:
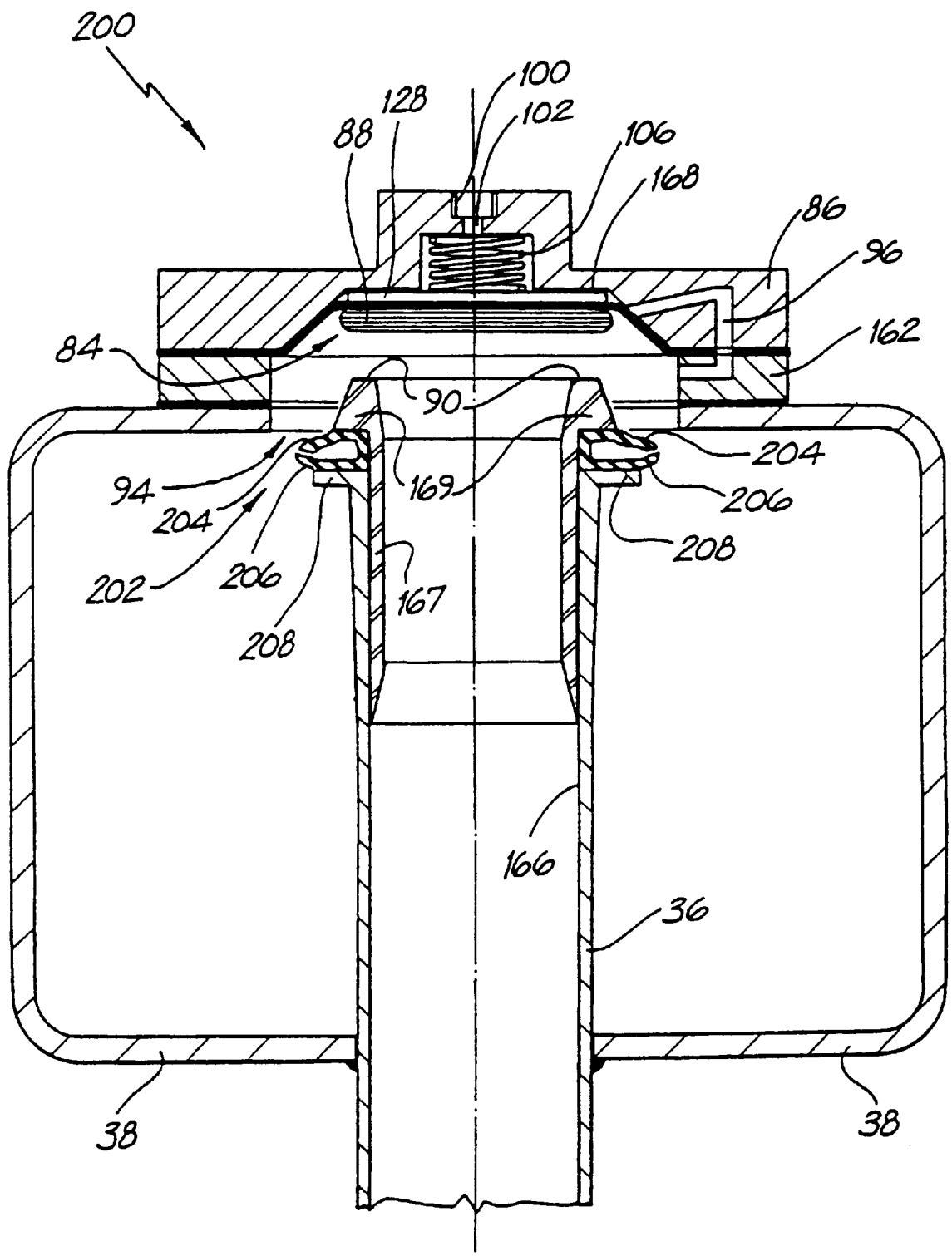
FIG. 11 illustrates a cross section through the valve of FIG. 10 in a first open condition.
Figure 12:
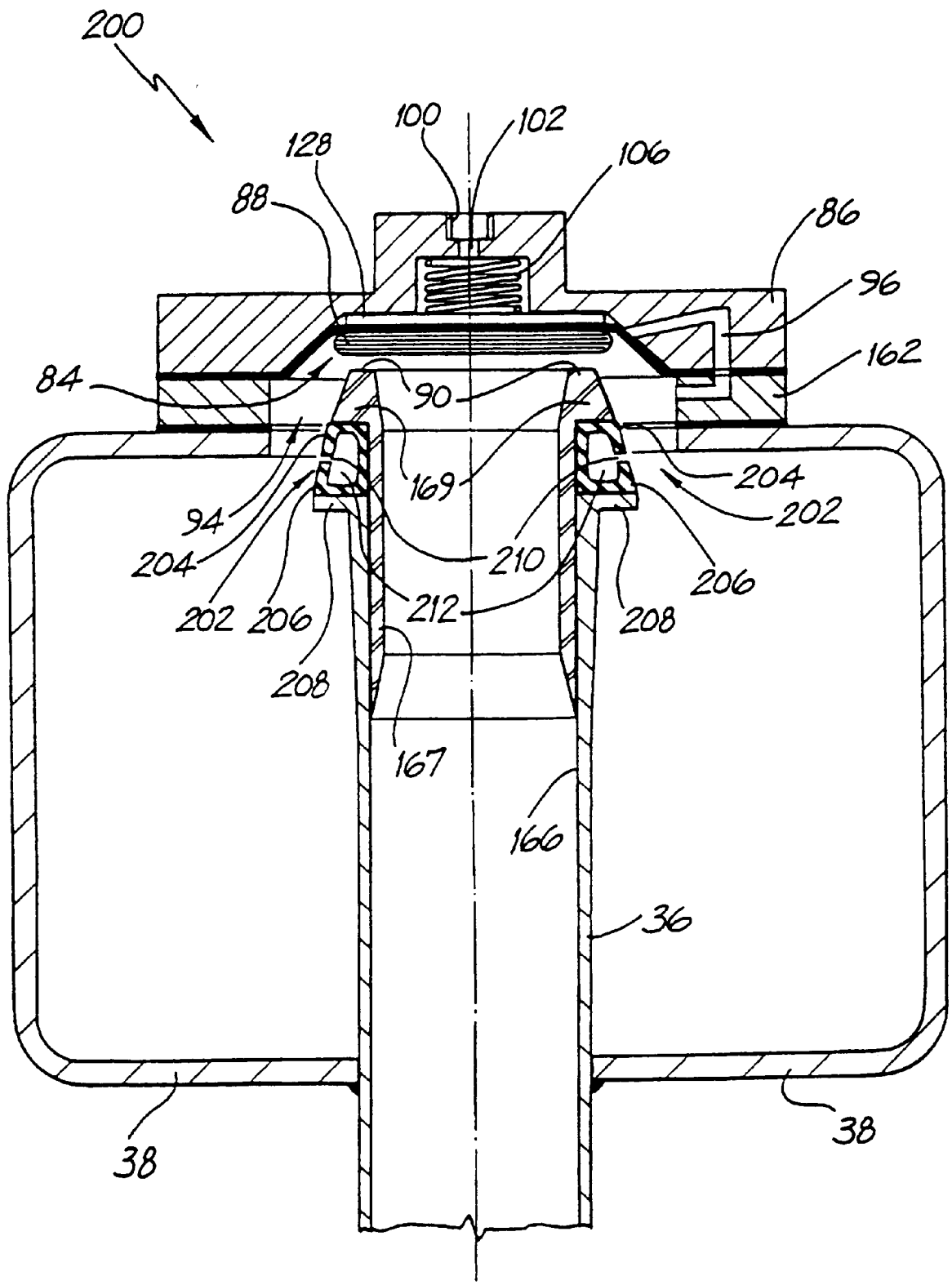
FIG. 12 illustrates a cross section through the valve of FIG. 10 in a second open condition.

Illustrated in FIGS. 10, 11 and 12, is a valve assembly similar to FIG. 8 and 9, shown in the closed, first open and second open conditions. In FIGS. 10, 11 and 12, like parts have been like numbered.

Illustrated in FIG. 10 is a valve 200 which has the same basic construction as the valve 160. However, instead of the elastomeric spring formation 164 of FIG. 8, is replaced by an expandable elastomer formation 202 which is mounted around the pipe member 167. The elastomer formation 202 can include a coil compression spring if desired, or it can act as a spring formation by means of the constructional features it is formed by. The pipe member 167 differs from that of FIG. 8 by including a flanged end 169 to form the seat 90. The flanged end 169 cooperates with the end 204 of elastomer formation 202. The elastomer formation 202 has elasticity such that, when not under a sufficient compressive force, it can expand to an unstressed state, or alternatively it may have a shape memory which will allow the elastomer formation 202 to act as a source of motive power to move the pipe member 167.

Thus in the closed and open positions as in FIGS. 10 11 and 12, the elastomer formation 202 has another end 206 which rests upon a flange 208 on the end of blowtube 36. The elastomer formation 202 has a hollow construction, as is illustrated by the cross section of FIG. 12, with one or more bleed holes 210. The bleed holes 210 allow air to enter, at a controlled predetermined rate, into the hollow 212 of the elastomer spring 202.

Thus, when the closed condition of FIG. 10 is changed to the first open condition or high lift position of FIG. 11, the elastomer formation 202 can begin expanding after a predetermined time so as to achieve the second open condition by a predetermined time, eg 20 to 100 milliseconds or can expand continuously at a controlled rate dictated by the size and number of the bleed holes 210, until the second open condition or low lift position of FIG. 12 is attained.

If desired, the elastomer formation 202 need not have specially constructed bleed holes 210. Rather, a hollow annular construction from a rubber or other elastomeric compound having a predetermined porosity can be utilised The porosity can take the place of the bleed holes 210 to control the rate of expansion, or return to the original shape of the elastomer spring 202.

If desired, the pipe member 167 can be dispensed with, and the elastomer formation 202 by means of the top surface 204 can act as a valve seat (instead of valve seat 90) which cooperates with disc seat 88 to close the valve 200. This alteration can also be made to the arrangement described in the next paragraph.

The drawings of FIGS. 10, 11 and 12 also serve to illustrate another port or seat 90 repositioning means. Also identical construction and features could be used as for the valve 200, except that the elastomer formation 202 need not have any spring or memory characteristics. In this embodiment the elastomer formation 200 represents a hollow, circular structure with bleed holes 210. The elastomer formation 202 will function in the same way as that of the spring type elastomeric formation 210, in the closed condition, and the first open condition, however the elastomer formation 202 will not be caused to expand because of its material or inherent spring properties. Rather, it will expand because of pressure differences, once air begins to exit past the seat 90, the exiting of air will cause the air pressure in the region of seat 90 to drop. Because of bleed 210 only permitting air to enter at a controlled rate, the elastomer formation 202 will begin in inflate, at a controlled rate, due to difference in air pressure. This will happen until such time as the second open condition is achieved.

To control this rate of expansion several methods can be used and combinations of these methods:

(1) set the size of the bleed holes 210 according to the expansion rate required;

(2) utilise bleed tubes which open at another portion of header 38, where the pressure differential between that another portion and seat 90 is greater, or at other positions to get a different pressure differential.

The inflatable nature of the elastomer formation 202 can also be combined with the spring or shape memory characteristics or construction to vary the expansion rate.

Valves 200 (of FIG. 10), 160 (of FIG. 8) or 170 (of FIG. 9) or 110 (of FIG. 5) can be utilised in a method of operating a filter material cleaning system as described below in relation to FIG. 13.

In FIG. 13 is a representation of 6 rows 14, 146, 148, 320, 322 and 324 of filter bags, of which only the closest one is visible. Above each row is a corresponding blowtube 36, 150, 152, 151 153 and 155 respectively. Each blow tube has associated with it a corresponding valve 321, 323, 325, 327, 329, and 3331 respectively, which may be any one of the valves 200, or 170, or 160 or 110 of the previous figures. Preferably in the cleaning system the same version of the valve is used for each row, so as to control the rates of opening.

Because the valves 321 to 331 each have an automatic or inherent delay before the second open condition is attained, the previously mentioned method which calls for the simultaneous opening of two adjacent valves of two adjacent rows, as discussed in relation to FIG. 4 cannot be utilised in simultaneous operation, because of the valves 321 to 331 opening to the first open condition first.

Thus, the following method allows the valves 321 to 331 to be utilised so that redepositing at least on one, next adjacent, filter bag is substantially prevented.

In the first version of the method, valve 321 which corresponds to blowtube 36 for row 14, is made to attain the first opened condition and then automatically or inherently attains the second open condition after the predetermined time (of say 20 to 500 milliseconds depending on previously mentioned factors). When the valve 321 is first placed in the first open condition, none of the other valves 323 to 331 for the other blowtubes are actuated or opened.

However, as soon as the valve 321 for row 14 attains the second open condition, either at the time when that attainment occurs, or a predetermined time into that condition, (say 0.5 seconds if the second open condition lasts for 1 second, or 1 second if it lasts for 2 seconds), the next adjacent valve 323 which is that valve associated with blowtube 150 is opened, and the first open condition for that valve is attained and the second open condition is automatically or inherently attained (as is inherent by the design of the valves 200 or 160 or 170).

The valve 321 for blowtube 14 will attain the closed condition after the predetermined time for the second open condition has elapsed, which may or may not overlap with the second open condition of the valve 323 associated with blowtube 150.

Irrespective of the closing of valve 321, valve 325 is opened to the first open condition, either when valve 323 attains the second open condition, or at a predetermined time into that second open condition, (say 0.5 seconds if the second open condition lasts for 1 second, or 1 second if it lasts for 2 seconds).

This process continues across the cleaning system until all rows from 148 to 324 have been also cleaned. This process will move the dust tending to redeposit from one end to the other and may result in a comparatively better cleaning efficiency by comparison to the previously mentioned method in respect of FIG. 4, when the amount of air consumed in the cleaning process is taken into account.

A less efficient method similar to that first described with respect to FIG. 13, is for the process to occur at one or two of the centre rows, eg row 148 and 320, and to control the valves, in the previously mentioned overlapping sequential fashion, in two directions (in the case of FIG. 13 to the left and right). Whilst this may take less time, it may require a higher replenishment rate of the header pressure to keep up with four valves potentially being opened at one time.

If desired the valves 110 of FIG. 4 can be made to operate by the same two methods described above with respect to FIG. 13, except that two control signals would be required to activate the first and second open conditions.

Whilst the above descriptions include references to nozzles 34 of FIG. 1, in many reverse pulse cleaning systems already in use in the market place, actual nozzles are not used. Instead, the blowtubes 36 have a port or opening above the filter bags so that the reverse pulse of air or the dislodging jet and any lower flow rates, which occur at the first and second open conditions respectively, can act on the filter material of the filter bags.

The foregoing describes several embodiments of the present invention and modifications by those skilled in the art can be made thereto, without departing from the scope of the present invention.

I claim:

1. A valve usable to delivering compressed air to periodically clean a filter material, said valve including a compressed air inlet and outlet and a sealable port therebetween, said port being selectively sealed by a sealing member which can be moved between a closed condition relative to said port and at least a first open condition or a second open condition or between a first open condition and a second open condition or a second open condition to a first open condition, at said first open condition air flow through the open port being, when in use, greater than the air flow through said port when said sealing member and said port are in said second open condition at a predetermined operating pressure, said valve including a diaphragm wherein said sealing member cooperates with said diaphragm so as to seal said port and be moved thereby between said closed and said first open conditions and wherein said diaphragm moves said sealing member by means of a pressure differential produced across said diaphragm, said valve further including simultaneously or sequentially actuatable seal or port re-positioning means so that when said seal or port re-positioning means is actuated, said port or said sealing member are repositioned relative to each other so as to attain said first or second open condition.

2. A valve as claimed in claim 1, wherein attainment of said second open condition from said first open condition or of said first open condition from said second open condition is achieved by said seal member moving away from or toward said port which is relatively substantially stationary.

3. A valve as claimed in claim 1, wherein said first or second open condition is selected or attained by means of a second diaphragm arrangement cooperating with a first diaphragm, so as to at least move said seal member from said first open condition to said second open condition.

4. A valve as claimed in claim 1, wherein said port is formed as part of a port member which is moveable relative to said seal member in the same direction of movement of said seal member so as to attain said second open condition.

5. A valve as claimed in claim 4, wherein said port member is biased towards said seal.

6. A valve as claimed in claim 4, wherein said port member is an elastomeric formation which includes a resilient elastic characteristic or spring like formation, so as when pressure is applied by said seal member said port member is compressed to sit against said seal member.

7. A valve as claimed in claim 6, wherein a rate of expansion, recovery or elongation of said elastomeric for-mation is determined by means of resilience properties of the elastomer(s) comprising said elastomeric formation and or the structural properties of the elastomeric formation which provide resilience.

8. A valve as claimed in claim 5, wherein said port member includes an elastomeric formation having a hollow portion such that the decompression or expansion of the elastomeric formation is determined by the rate at which air can enter the hollow portion via a bleed hole or via porosity of said elastomeric formation.

9. A valve as claimed in claim 5, wherein said port member includes a formation which is of a hollow construction having at least one bleed hole or aperture so that said formation will inflate or deflate.

10. A valve as claimed in claim 9, wherein when pressure is applied by said seal member, the formation will deflate and be compressed so as to provide a seat for said seal member.

11. A valve as claimed in claim 1, wherein when said valve is placed in said first open condition, said formation will inflate at a predetermined rate so said valve will attain said second condition.

12. A valve as claimed in claim 4, wherein said port member includes a pipe member which is able to slide relative to a portion of said valve, under the influence of said formation or elastomeric formation.

13. A valve as claimed in claim 1, wherein said seal member attains said first open condition by said diaphragm and attains said second open condition from said first open condition by the subsequent movement of said port towards said seal member.

14. A valve as claimed in claim 1, wherein said first open condition and said second open condition are selected by two control signals or actuations.

15. A valve as claimed in claim 1, wherein said first open condition and said second open condition are selected by a single control signal such that said second open condition is achieved by automatic or inherent means.

16. A valve as claimed in claim 1, wherein said first open condition is also such that said seal and said port are separated by a relative maximum distance and at said second open condition said relative maximum distance is reduced.

17. A valve as claimed in claim 1, wherein the time taken to attain said second open condition after said first open condition determines the time for the maximum air flow operating at a higher level than air flow at said second open condition.

18. A valve as claimed in claim 1, wherein attainment of said second open condition from said first open condition or of said first open condition from said second open condition is achieved by said port moving away from or toward said seal member which is relatively stationary.

19. A valve as claimed in claim 1, wherein when a cleaning cycle is started said valve is fully opened up to a full capacity air flow at said first open condition.

20. A valve as claimed in claim 1, wherein full capacity air flow or said first open condition will last from between 20 to 500 milliseconds.

21. A valve as claimed in claim 20, wherein full capacity air flow or said first open condition will last for between 40 to 100 milliseconds.

22. A valve as claimed in claim 1, wherein in a second open condition the opening of said valve is reduced by approximately 5% to 20% of the initial opening at said first open condition.

23. A valve as claimed in claim 1, wherein said open condition or second open condition has a duration of approximately 0.5 to 2 seconds.

24. A valve as claimed in claim 1, wherein, said first open condition includes an air flow passing through said valve of approximately 4 to 6 times the air flow passing through said valve at said second open condition.

25. An air cleaning assembly to clean an filter or cartridge systems, said assembly including a valve as claimed in claim 1.

* * * * *